(12) United States Patent
Yuan et al.

(10) Patent No.: US 9,804,985 B2
(45) Date of Patent: Oct. 31, 2017

(54) HARDWARE ABSTRACT DATA STRUCTURE, DATA PROCESSING METHOD AND SYSTEM

(75) Inventors: Cissy Yuan, Shenzhen (CN); Erkun Mao, Shenzhen (CN); Jian Wang, Shenzhen (CN); Xuehong Tian, Shenzhen (CN); Daibing Zeng, Shenzhen (CN); Wanting Tian, Shenzhen (CN); Qian Chen, Shenzhen (CN)

(73) Assignee: Sanechips Technology Co., Ltd., Shenzhen (CN)

( * ) Notice: Subject to any disclaimer, the term of this patent is extended or adjusted under 35 U.S.C. 154(b) by 611 days.

(21) Appl. No.: 14/369,903

(22) PCT Filed: May 8, 2012

(86) PCT No.: PCT/CN2012/075195
§ 371 (c)(1),
(2), (4) Date: Jun. 30, 2014

(87) PCT Pub. No.: WO2013/097393
PCT Pub. Date: Jul. 4, 2013

(65) Prior Publication Data
US 2015/0032930 A1    Jan. 29, 2015

(30) Foreign Application Priority Data

Dec. 30, 2011   (CN) .......................... 2011 1 0454003

(51) Int. Cl.
*G06F 13/40*    (2006.01)
*G06F 5/06*    (2006.01)
(Continued)

(52) U.S. Cl.
CPC ............ *G06F 13/4004* (2013.01); *G06F 5/06* (2013.01); *G06F 7/78* (2013.01); *G06F 9/44505* (2013.01)

(58) Field of Classification Search
CPC .......... G06F 13/4004; G06F 5/06; G06F 7/78; G06F 9/4405
See application file for complete search history.

(56) References Cited

U.S. PATENT DOCUMENTS 5,444,853 A    8/1995  Lentz
5,649,230 A    7/1997  Lentz
(Continued)

FOREIGN PATENT DOCUMENTS

CN    1898666 A    1/2007
CN    101689170 A    3/2010
CN    102136130 A    7/2011

OTHER PUBLICATIONS

Supplementary European Search Report in European application No. 12861586.1, mailed on Oct. 1, 2015.
(Continued)

*Primary Examiner* — Nimesh G Patel
(74) *Attorney, Agent, or Firm* — Oppedahl Patent Law Firm LLC (57) ABSTRACT

A Hardware Abstract Data Structure (HADS) includes a General Interface (GI), a Coherence Interface (CI), a Control and Configuration Logic (CCL), an Intelligence Logic (IL) and a Memory Pool (MP), wherein the GI is arranged to implement intercommunion between the HADS and a processor; the CI is arranged to implement coherence storage between multiple processors; the CCL is arranged to, in response to a command received by the GI, configure a hardware data structure for the MP; the IL is arranged to complete a large amount of simple and frequent data processing; and the MP is arranged to store data. Correspond- (Continued)

ingly, a method and data processing system are also disclosed. Through the disclosure, the HADS which is dynamically configurable, flexible, efficient, universal in interface and good in interconnectivity can be implemented to improve the data processing efficiency.

19 Claims, 10 Drawing Sheets

(51) Int. Cl.
  *G06F 9/445* (2006.01)
  *G06F 7/78* (2006.01)

(56) References Cited

U.S. PATENT DOCUMENTS

| | | |
|---|---|---|
| 6,292,855 B1 * | 9/2001 | Johnson .................. G06F 13/10 710/104 |
| 6,952,696 B1 | 10/2005 | Nadj |
| 7,458,022 B2 | 11/2008 | Ramarao |
| 2004/0205304 A1 * | 10/2004 | McKenney ........... G06F 9/5016 711/148 |
| 2005/0091589 A1 | 4/2005 | Ramarao |
| 2006/0004897 A1 | 1/2006 | Nadj |
| 2006/0294483 A1 * | 12/2006 | Mukund ............. G06F 15/7867 326/38 |
| 2007/0229900 A1 * | 10/2007 | Guarnieri ............... G06K 15/02 358/1.17 |
| 2011/0113210 A1 * | 5/2011 | Klapman .......... G06F 17/30091 711/163 |
| 2011/0296078 A1 * | 12/2011 | Khan ....................... G06F 9/54 711/5 |

OTHER PUBLICATIONS

Implementing abstract data structures in hardware, mailed on Aug. 1988.
International Search Report in international application No. PCT/CN2012/075195, mailed on Oct. 18, 2012.
English Translation of the Written Opinion of the International Search Authority in international application No. PCT/CN2012/075195, mailed on Oct. 18, 2012.

* cited by examiner

HARDWARE ABSTRACT DATA STRUCTURE, DATA PROCESSING METHOD AND SYSTEM

TECHNICAL FIELD

The disclosure relates to data storage technology, and more particularly to a Hardware Abstract Data Structure (HADS), a data processing method and a data processing system.

BACKGROUND

When a processor is adopted to process a specific task, it is necessary to abstract the task into a proper data structure, the basic type of which includes a set, a linear structure, a tree structure, a graphic structure and the like. Most of these structures are implemented by software, which is low in efficiency, complex to implement and relatively large in energy consumption. A stack is taken as an example below to show how the software implements a specific data structure.

Figure 1:
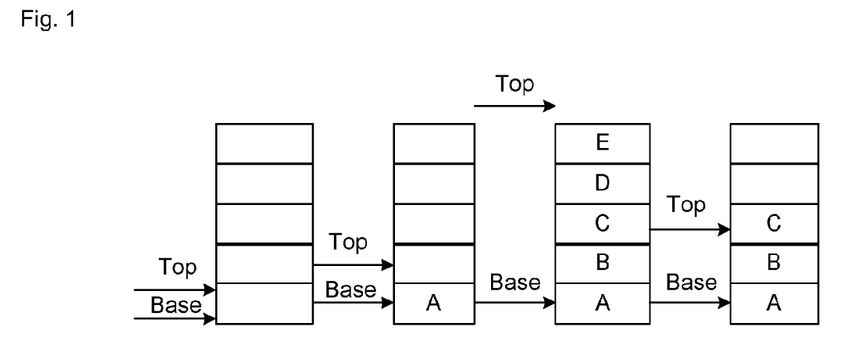
FIG. 1 is a diagram showing a principle of implementing a stack by existing software.

The stack is a linear table in which insertion or deletion is performed only at the top and base of the stack. A process of implementing the stack by software includes: firstly, applying for storage space according to maximum usage amount of the stack, and setting a top pointer and a base pointer for the stack, during initialization, the stack is null and the top pointer points to the base, namely, the top is equal to the base; secondly, pushing data into the stack through a push instruction and adding 1 to the top for each push operation; and finally, popping the data stored in the stack through a pop instruction and subtracting 1 from the top for each pop operation. Here, the top and base pointers are stored in a register or a memory, and the operation of adding or subtracting 1 also needs to be completed through an instruction. A principle of implementing the stack by software is as shown in FIG. 1. It can be seen that at least two instructions are required for each operation of the stack and more instructions are required if it is necessary to implement an anti-coverage function or other functions of the stack, so that the processing efficiency of the stack is relatively low.

Figure 2:
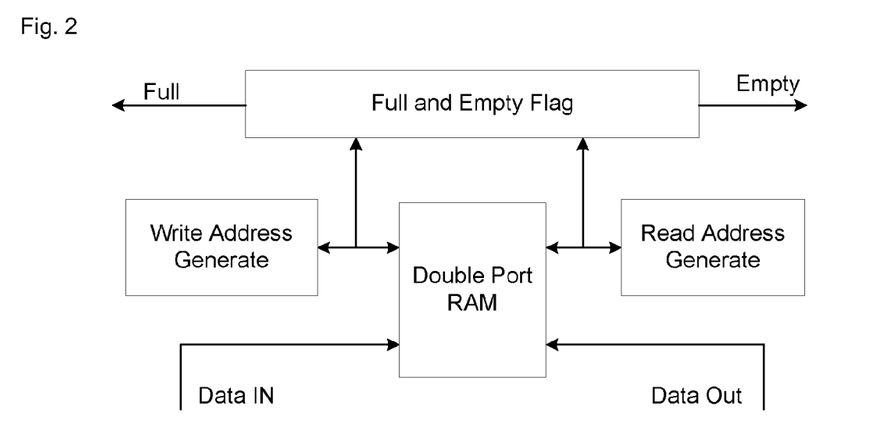
FIG. 2 is a diagram showing the structure of an FIFO implemented by existing hardware.

At present, hardware may be adopted to implement data structures, but only some data structures can be implemented, such as a First In First Out queue (FIFO), a stack, a heap, a queue, and other sets or linear structures. Since data structures implemented by the hardware are generally implemented by firmware, the data structures are poor in configurability and flexibility and waste system resources. An FIFO structure implemented by hardware is as shown in FIG. 2. It can be seen that the hardware FIFO includes read address generate, write address generate, a double-port RAM, and a full and empty flag of the FIFO. Moreover, the compatibility of input and output interfaces needs to be considered. The FIFO implemented by hardware is relatively high in efficiency and can be directly utilized without configuration, but the size, interface and the like of the FIFO are fixed. In addition, when a processor needs not to use the FIFO, the FIFO will be wasted since the FIFO cannot be used as a heap or other structures. Moreover, a tree structure cannot be reused and is relatively complex in design if implemented by hardware.

SUMMARY

In view of this, the disclosure provides an HADS, a data processing method and a data processing system, so as to implement an HADS which is dynamically configurable, flexible, efficient, universal in interface and good in interconnectivity, and improve the data processing efficiency.

To this end, a technical solution of the disclosure is implemented as follows.

An HADS includes a General Interface (GI), a Control and Configuration Logic (CCL) and a Memory Pool (MP), wherein the GI is arranged to implement intercommunion between the HADS and a processor, wherein the CCL is arranged to, in response to a configuration command received by the GI, configure a hardware data structure for the MP, and wherein the MP is arranged to store data.

The HADS may further include a Coherence Interface (CI), arranged to make multiple cores interconnected and directly access the data.

The HADS may further include an Intelligence Logic (IL), wherein the CCL is further arranged to, in response to a command received by the GI, control data transmission between the MP and an interface, data processing in the IL and bypass of the data, and wherein the IL is arranged to process the data stored in the MP under the control of the CCL.

The IL may be further arranged to output the processed data or write the processed data back to the MP under the control of the CCL.

A data processing method includes that:

a processor configures an HADS such that a memory block in the HADS is configured in a required hardware data structure; and stores data by using the configured memory block.

The step that a processor configures an HADS such that a memory block in the HADS is configured in a required hardware data structure may include that:

the processor sends a configuration command to a CCL through a GI, wherein the configuration command at least includes information of the hardware data structure requiring to be configured; and in response to the configuration command, the CCL configures the hardware data structure for an MP such that the memory block in the MP is configured in the required hardware data structure.

The method may further include that:

the processor directly accesses the data in the MP through a CI or a GI; and the CCL controls data transmission between the MP and an interface, data processing in an IL and bypass of the data between the CI and the GI.

The method may further include that:

the CCL controls the IL to output the processed data or write the processed data back to the MP.

The processor may be a local processor and/or a remote processor.

A data processing system includes a processor and an HADS according to any one of claims 1 to 4.

The processor may be a local processor and/or a remote processor.

The HADS in an embodiment of the disclosure, and the HADS in the data processing method and the data processing system in an embodiment of the disclosure include: a GI, a CCL and an MP. The GI is arranged to implement interconnection between the HADS and a processor; the CCL is arranged to, in response to a configuration command received by the GI, configure a hardware data structure for the MP; and the MP is arranged to store data. Through the disclosure, an HADS which is completely dynamically configurable, flexible, efficient, universal in interface and good in interconnectivity is implemented. The HADS may be adopted to more efficiently and flexibly implement a storage structure (such as a cache, a TCM and a CAM), a linear structure (such as an FIFO, a buffer, a heap, a stack, a queue, a link and a table), and other structures (such as a tree structure and an implementation diagram). Meanwhile, the disclosure has the functions of intelligently processing and converting data, processes the data more closely to a memory and relies less on a bus to the greatest extent, thereby reducing the load of the processor, improving the performance, reducing the power consumption and saving the cost.

DETAILED DESCRIPTION

The basic idea of the embodiment of the disclosure is that an HADS includes that: a GI, a CCL and an MP, wherein the GI is arranged to implement intercommunion between the HADS and the processor; the CCL is arranged to, in response to a configuration command received by the GI, configure a hardware data structure for the MP; and the MP is arranged to store data.

Figure 3:
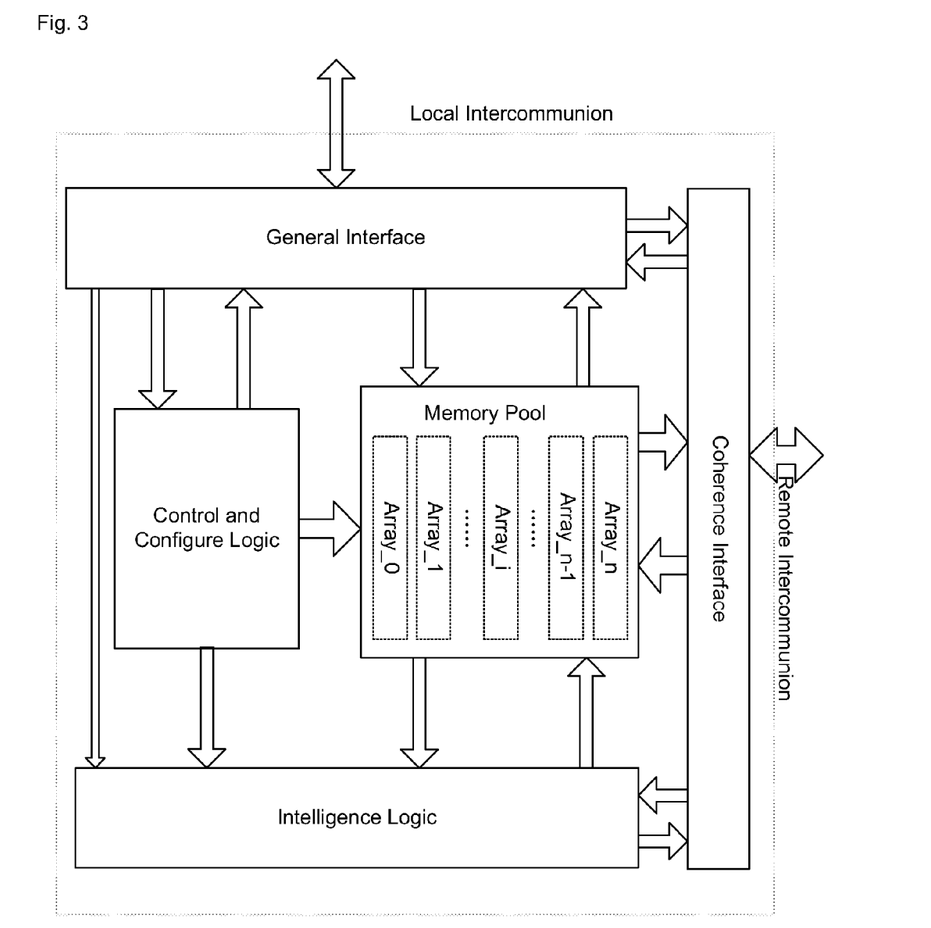
FIG. 3 is a diagram of an HADS according to an embodiment of the disclosure.

FIG. 3 is a diagram of an HADS according to an embodiment of the disclosure. As shown in FIG. 3, the HADS includes: a GI, a CCL and an MP.

The GI is interconnected with a processor and is arranged to implement intercommunion between the HADS and the processor.

The CCL is arranged to configure, in response to a configuration command received by the GI, a hardware data structure for the MP. Specifically, the CCL may dynamically configure a Memory Array (MA) in the MP into a required hardware data structure, such as a cache structure, a TCM structure, a CAM structure, an FIFO structure, a buffer structure, a heap structure, a stack structure, a queue structure, a table structure, a link structure, a tree structure, and a graphic structure.

The MP is arranged to store data. Here, the data is a generalized concept and may further include an index, a pointer and the like besides specific data. Generally, an MP is composed of many memory blocks (which may, but is not limited to, be represented by an array). A memory of certain size may be configured into n MAs, and the function of each MA is completely configurable. For example, each MA may store an index, a pointer or data. Except the MP, all other components are referred to as HADS Intelligence Control and Interconnect (HADS-ICI) in the disclosure.

The HADS further includes a CI, which is arranged to make multiple cores interconnected and directly access the data.

The HADS further includes an IL, the CCL is further arranged to, in response to a command received by the GI, control data transmission between the MP and an interface, data processing in the IL and bypass of the data; and the IL is arranged to process the data stored in the MP under the control of the CCL.

The IL is further arranged to output the processed data or write the processed data back to the MP under the control of the CCL.

The HADS may further include a CI, which is arranged to implement intercommunion between multiple cores and may be used for direct data access (such as DMA).

Figure 4:
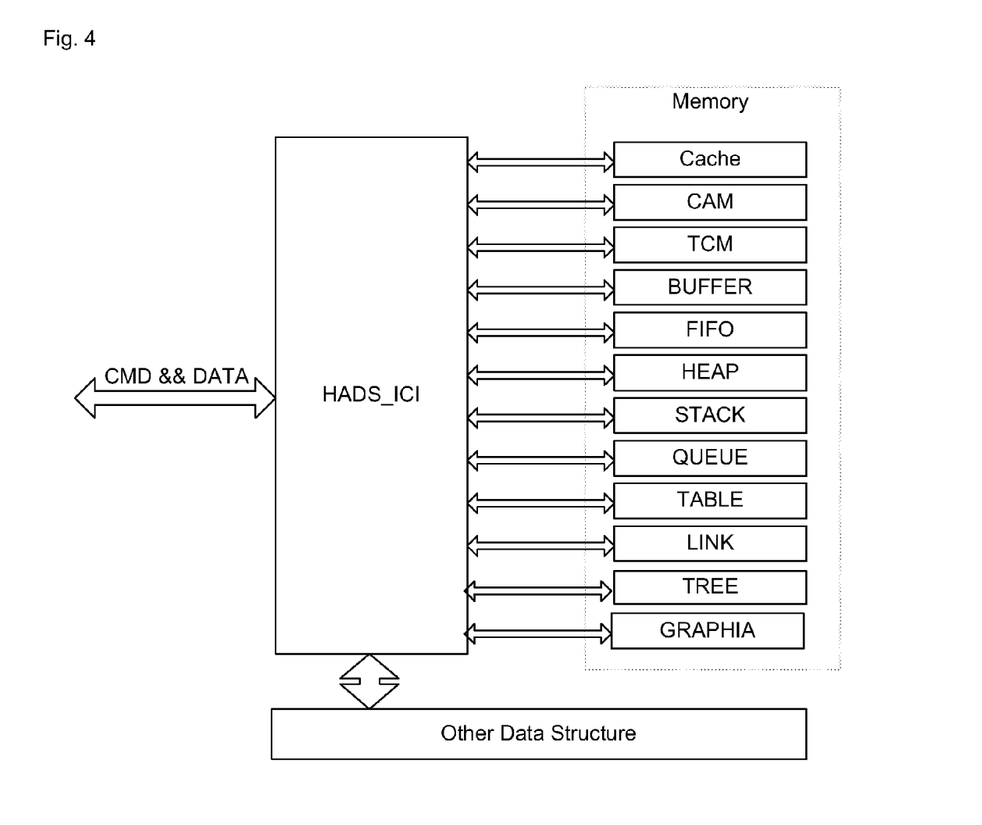
FIG. 4 is a diagram of a data structure which may be implemented by the HADS.

It should be noted that, based on the HADS, the whole MP may be configured in different data structures according to the requirement of software. FIG. 4 is a diagram of a data structure which may be implemented by the HADS. As shown in FIG. 4, the system may configure the MP into different data structures, the attributes of which may be changed dynamically even though these data structures are being used. In addition, all data or indexes input or output by these data structures may be processed by the IL. Not all accesses must return a value to the processor. Data may even flow between different data structures to achieve the aims of saving the bandwidth of the bus and reducing the load of the processor. The processor is only responsible for complex operation and control, so as to improve the processing performance.

Correspondingly, an embodiment of the disclosure further discloses a data processing method, which includes that:

a processor configures an HADS such that a memory block in the HADS is configured in a required hardware data structure, and the processor stores data by using the configured memory block.

The operation that the processor configures the HADS such that a memory block in the HADS is configured in the required hardware data structure includes that:

the processor sends a configuration command to a CCL through a GI, wherein the configuration command at least includes the information of the hardware data structure requiring to be configured; and in response to the configuration command, the CCL configures the hardware data structure for an MP such that the memory block in the MP is configured in the required hardware data structure.

The method further includes that:

the processor directly accesses the data in the MP through a CI or GI; and the CCL controls data transmission between the MP and an interface, data processing in an IL and bypass of the data between the CI and the GI.

The method further includes that:

the CCL controls the IL to output the processed data or write the processed data back to the MP.

The processor is a local processor and/or a remote processor.

Correspondingly, an embodiment of the disclosure further discloses a data processing system, which includes a processor and the aforementioned HADS.

The processor is a local processor and/or a remote processor. Multiple processors may share one or more data structures.

The technical solution of the disclosure is further elaborated below in combination with embodiments in detail.

Embodiment 1

Figure 5:
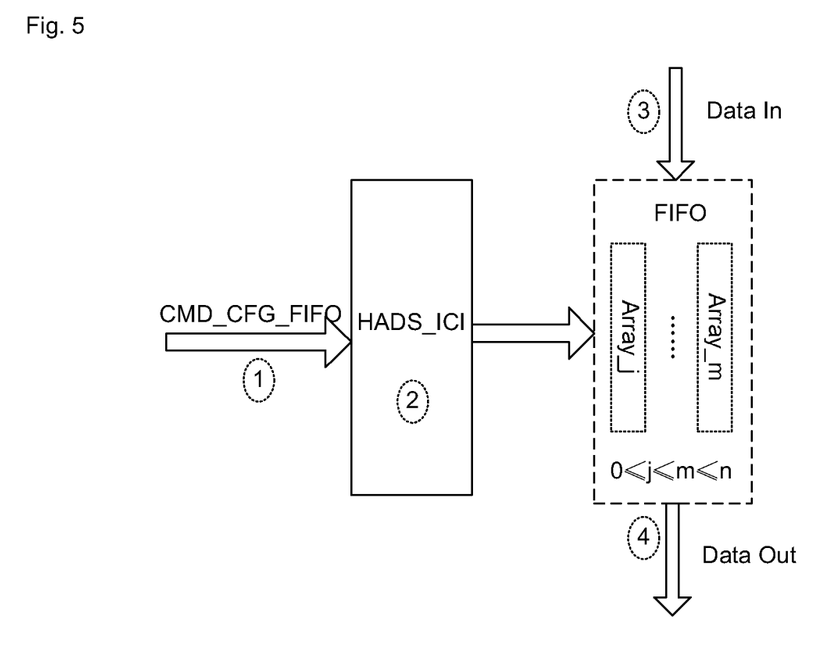
FIG. 5 is a diagram of an FIFO implemented by an HADS in a first embodiment of the disclosure.

FIG. 5 is a diagram of an FIFO implemented by the HADS in a first embodiment of the disclosure. As shown in FIG. 5, in the embodiment, the HADS will generate a hardware FIFO under the control (②) of the CCL according to a simple FIFO command (①) configured in the MP. The characteristics of the hardware FIFO includes a size, input and output directions of data (data is from a GI or a CI, or may be assigned to be output from a GI or a CI), enabling bypass and whether data coverage being supported; and it may even generate an interrupt according to the state of the FIFO, and a command may also be utilized during the process of use to properly change an attribute of the FIFO. Under the support of the IL, the input (③) and output (④) of data may be subjected to an operation, a conversion or the like. The data of FIFO may be input from a processor or input from other structures in the HADS. Similarly, the output data can be directly returned to the processor or sent to other data structures.

Embodiment 2

Figure 6:
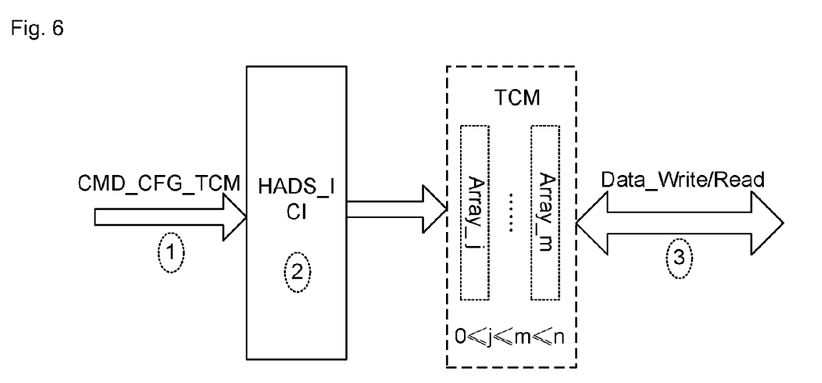
FIG. 6 is a diagram of a TCM implemented by an HADS in a second embodiment of the disclosure.

FIG. 6 is a diagram of a TCM implemented by the HADS in a second embodiment of the disclosure. It can be seen that, through configuration, the HADS may be simply used as a TCM, which may even return data required by a processor or other data structures in a clock period, so that the access delay is saved for the memory and the performance of the processor is improved.

Embodiment 3

Figure 7:
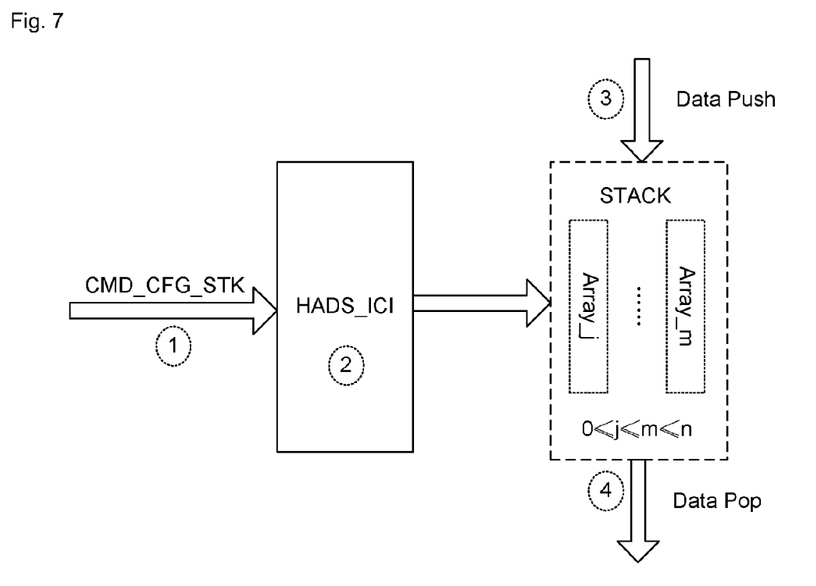
FIG. 7 is a diagram of a stack implemented by an HADS in a third embodiment of the disclosure.

FIG. 7 is a diagram of a stack implemented by the HADS in a third embodiment of the disclosure. The stack in FIG. 7 can be achieve the same flexibility as that in FIG. 1, and may be dynamically configured at any time through an instruction when the software feels its capacity insufficient. Unlike FIG. 1, the read and write addresses of the stack implemented by this method may be completely generated by the IL without a special address generation logic.

Embodiment 4

Figure 8:
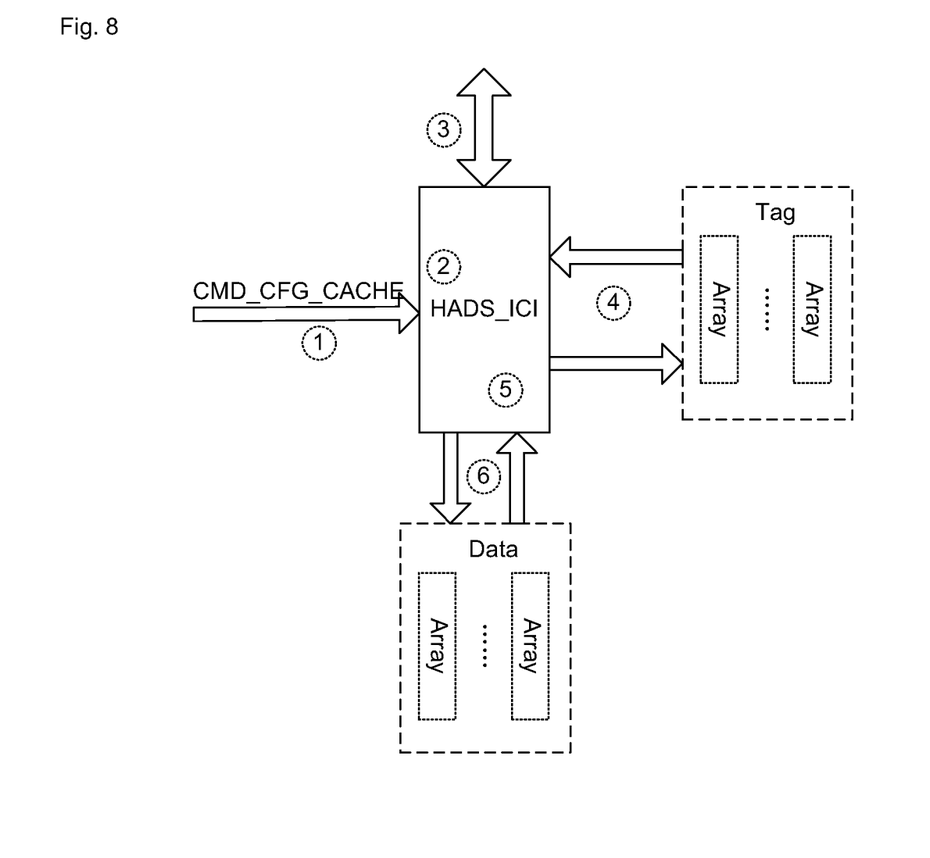
FIG. 8 is a diagram of a cache implemented by an HADS in a fourth embodiment of the disclosure.

FIG. 8 is a diagram of a cache implemented by the HADS in a fourth embodiment of the disclosure. To implement the cache, at least two memory arrays are required, which are used as TAG and DATA respectively. The IL and CCL may be adopted to achieve conversion between false and true addresses. One memory array may be even adopted to implement the function of the TLB. The CI may be adopted to implement the interconnection of multiple cores and the coherence function of the cache.

Embodiment 5

Figure 9:
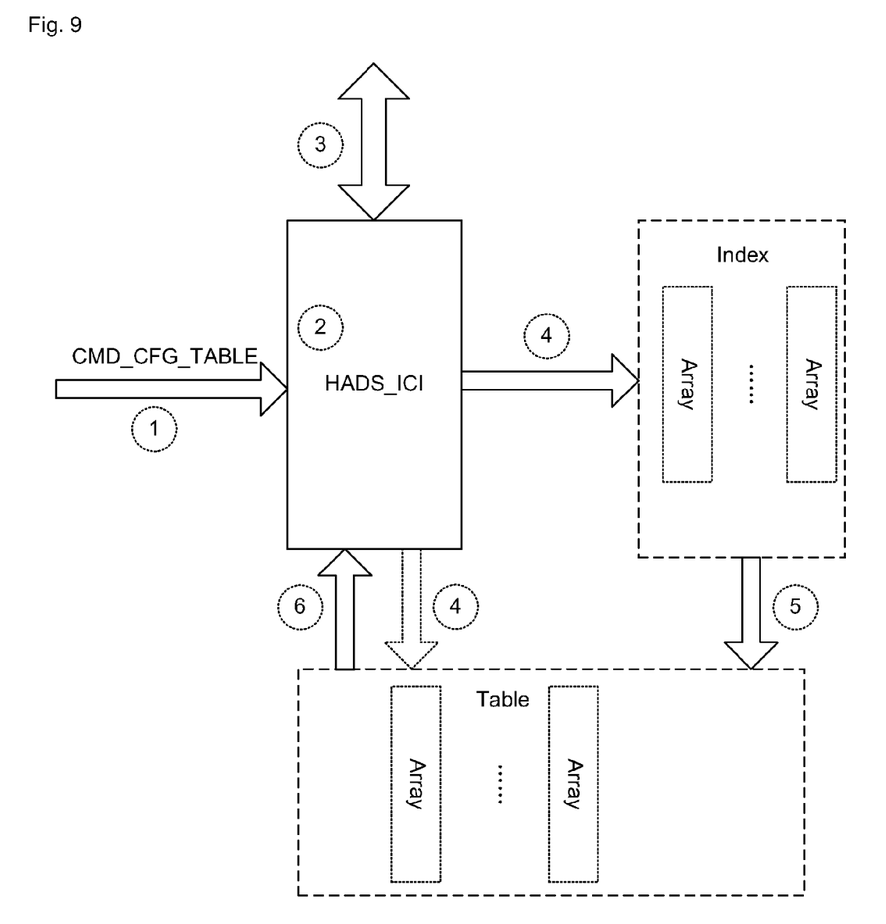
FIG. 9 is a diagram of a lookup table implemented by an HADS in a fifth embodiment of the disclosure.

In the embodiment, a lookup table is taken as an example to describe how to implement a table. FIG. 9 is a diagram of a lookup table implemented by the HADS in a fifth embodiment of the disclosure. Specifically, one or more memory arrays may be adopted to implement the lookup table. In FIG. 9, ④ represents an index; and data ⑥ may be obtained directly by looking up the table to implement the function of a primary lookup table; or the next index ⑤ may be obtained by looking up the table to implement a multi-level chain table.

Embodiment 6

Figure 10:
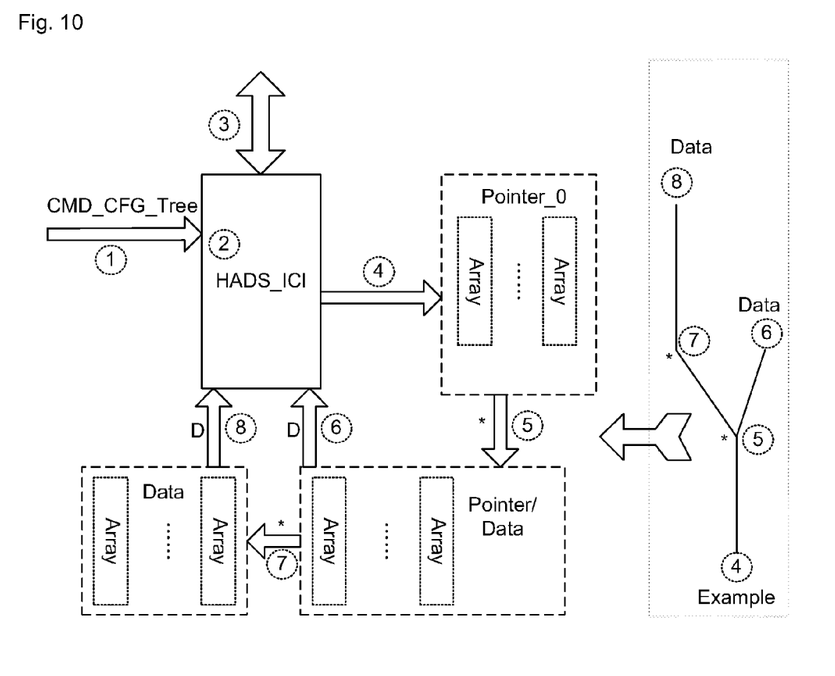
FIG. 10 is a diagram of a tree implemented by an HADS in a sixth embodiment of the disclosure.

FIG. 10 is a diagram of a tree implemented by the HADS in a sixth embodiment of the disclosure. ④ represents a root pointer of the tree, and ⑤ represents two branch pointers obtained by the root pointer. One of the branch pointers obtains data ⑥, reaches the leaf of the tree and terminates here, while the other of the branch pointers yet obtains a pointer ⑦, and will continue to trace till tracing the leaf and obtaining the required data ⑧. According to the requirement of the software, the tree structure implemented by the HADS may be a complex one and is not limited to that shown in FIG. 10.

It should be noted that FIGS. 5 to 10 only illustrate several data structures which may be implemented by the HADS. Under the control of the CCL and IL, the HADS may implement all conceivable data structures, data may flow between these data structure, and the IL may process these data. For example, two cores communicate with each other through an FIFO. If the big and small ends of each core are dynamically configurable, the data transmitted between them must match with the big and small ends according to the configuration change of the two cores. If the big and small ends of the two cores are consistent, the data will be directly transmitted to the CI.

Figure 11:
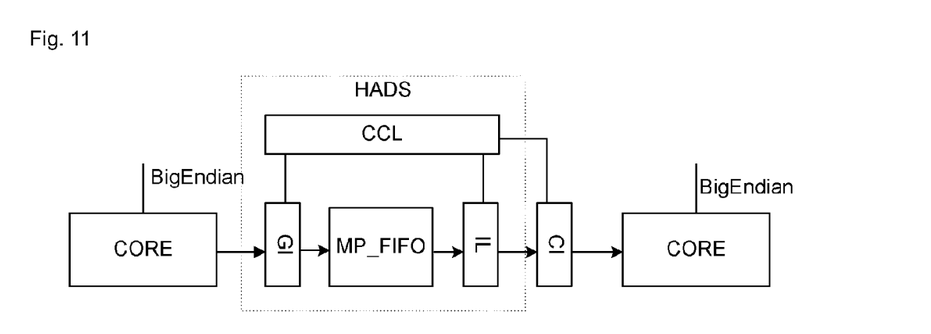
FIG. 11 is a diagram showing an example of data processing in an HADS.

If the big and small ends of the two cores are inconsistent, the data needs to be twisted according to the byte, which is implemented very easily by the IL. An example showing data processing in the HADS is as shown in FIG. 11.

It should be noted that the HADS is more convenient for matrix transformation, bit manipulation (such as bit extraction or insertion) or other operation of a large amount of data. A buffer may be defined in the HADS to store a processed intermediate result therein at first and then return the data to the processor after the data is completely processed.

Figure 12:
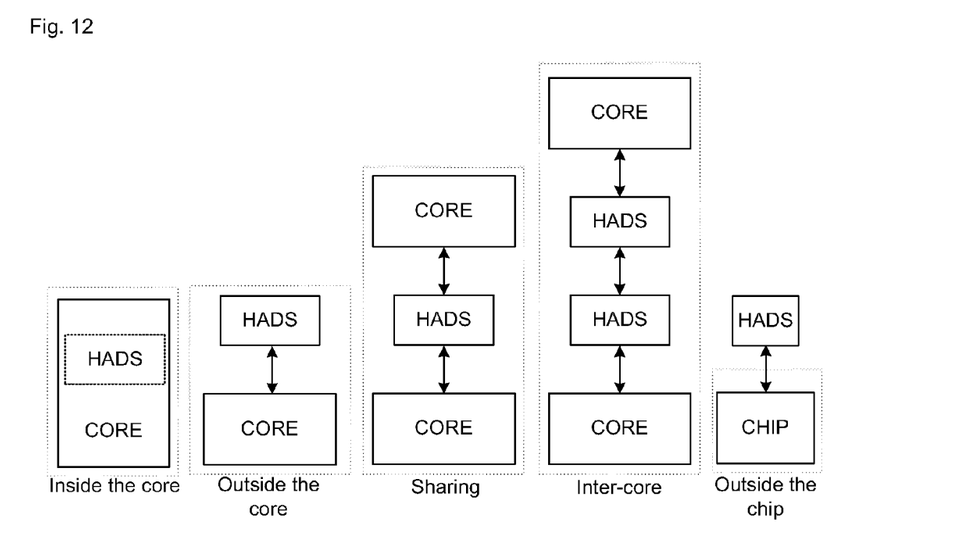
FIG. 12 is a diagram showing possible use of an HADS in a system.

Possible use of the HADS in a system is as shown in FIG. 12. It can be seen that the HADS is very flexible to use. The HADS may be used as a single-core internal memory or a multi-core shared memory. In addition, each core may have one or more HADSs. The coherence of data in the HADSs of the multiple cores is ensured by the CI between the cores. Of course, the HADS may be also used as an external memory.

Furthermore, multiple HADSs can be connected with one another to form a large HADS. The HADS may also coexist and communicate with other types of memories.

Figure 13:
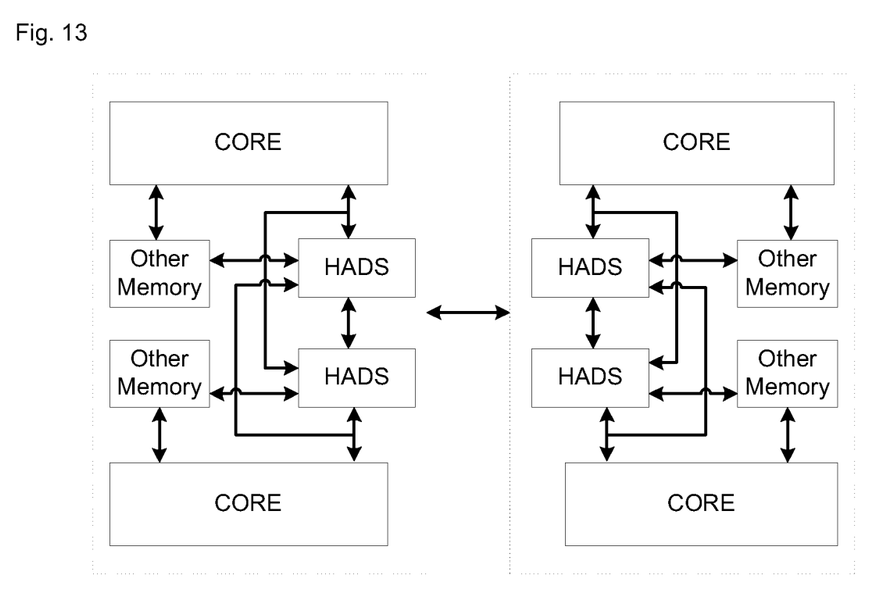
FIG. 13 is a diagram showing an example in which an HADS is used together with other memories.

That is, the HADS is applicable to any processor architecture, and may be used as the only memory of the processor or used together with other memories. An example showing that the HADS is used together with other memories is as shown in FIG. 13.

To sum up, compared with the prior art, the HADS has the following characteristics:

1) it is dynamically configurable and flexible, and which data structure the memory is used as completely depends on software;

2) it has high efficiency, which may completely achieve the same efficiency as that implemented by firmware;

3) various data structures may coexist in the memory, and data may flow between various data structures, thereby reducing the traffic of the data bus and facilitating the improvement of performance and the decrease of power consumption;

4) it may process the data input and output by various data structures, thereby reducing the load of the processor and improving the performance of the processor; and 5) it is flexible to use and is applicable to any processor architecture.

Compared with the prior art, the HADS of the disclosure achieves the same flexibility as a data structure implemented by software, and achieves the same efficiency as a data structure implemented by hardware. The HADS is applicable to any processor architecture and is completely dynamically configurable. The IL of the HADS has data processing and converting capability, so that the frequency of accessing the bus is reduced, which is favourable for the improvement of performance and the decrease of power consumption. In the HADS, various data structures may coexist, data may flow between various data structures, and the IL may process the flowing data, so that the loads of the bus and the processor are reduced. Therefore, the aims of improving the performance and decreasing the power consumption are achieved.

The above are only the preferred embodiments of the disclosure, and are not intended to limit the scope of protection of the claims of the disclosure.

The invention claimed is:

1. A Hardware Abstract Data Structure (HADS), comprising a General Interface (GI), a Control and Configuration Logic (CCL) and a Memory Pool (MP),
   wherein the GI is arranged to implement intercommunion between the HADS and a processor, receive a configuration command from the processor and send the configuration command to the CCL, the configuration command comprising at least information of a hardware data structure requiring to be configured,
   wherein the CCL is arranged to, in response to the configuration command received by the GI, configure the hardware data structure for the MP such that a memory block in the MP is configured in the required hardware data structure, the hardware data structure requiring to be configured is selected by the processer from a plurality of hardware data structures, and
   wherein the MP is arranged to store data.

2. The HADS according to claim 1, further comprising a Coherence Interface (CI), arranged to make multiple cores interconnected and directly access the data.

3. The HADS according to claim 2, further comprising an Intelligence Logic (IL),
   wherein the CCL is further arranged to, in response to a command received by the GI, control data transmission between the MP and an interface, data processing in the IL and bypass of the data, and
   wherein the IL is arranged to process the data stored in the MP under the control of the CCL.

4. The HADS according to claim 3, wherein the IL is further arranged to output the processed data or write the processed data back to the MP under the control of the CCL.

5. A data processing system, comprising a processor and a Hardware Abstract Data Structure (HADS) according to claim 2.

6. The system according to claim 5, wherein the processor is a local processor and/or a remote processor.

7. The HADS according to claim 1, further comprising an Intelligence Logic (IL),
   wherein the CCL is further arranged to, in response to a command received by the GI, control data transmission between the MP and an interface, data processing in the IL and bypass of the data, and
   wherein the IL is arranged to process the data stored in the MP under the control of the CCL.

8. The HADS according to claim 7, wherein the IL is further arranged to output the processed data or write the processed data back to the MP under the control of the CCL.

9. A data processing system, comprising a processor and a Hardware Abstract Data Structure (HADS) according to claim 8.

10. A data processing system, comprising a processor and a Hardware Abstract Data Structure (HADS) according to claim 7.

11. A data processing system, comprising a processor and a Hardware Abstract Data Structure (HADS) according to claim 1.

12. The system according to claim 11, wherein the processor is a local processor and/or a remote processor.

13. A data processing method, comprising:
   configuring, by a processor, a Hardware Abstract Data Structure (HADS) such that a memory block in the HADS is configured in a required hardware data structure; and
   storing data by using the configured memory block,
   wherein the step of configuring, by a processor, an HADS such that a memory block in the HADS is configured in a required hardware data structure comprises:
     selecting, by the processor, a hardware data structure requiring to be configured from a plurality of hardware data structures and sending a configuration command to a Control and Configuration Logic (CCL) through a General Interface (GI), wherein the configuration command at least comprises information of the hardware data structure requiring to be configured; and
   in response to the configuration command, configuring, by the CCL, the hardware data structure for a Memory Pool (MP) such that the memory block in the MP is configured in the required hardware data structure.

14. The method according to claim 13, further comprising:
   directly accessing, by the processor, the data in the MP through a Coherence Interface (CI) or a GI; and
   controlling, by the CCL, data transmission between the MP and an interface, data processing in an Intelligence Logic (IL) and bypass of the data between the CI and the GI.

15. The method according to claim 14, further comprising:
   controlling, by the CCL, the IL to output the processed data or write the processed data back to the MP.

16. The method according to claim 15, wherein the processor is a local processor and/or a remote processor.

17. The method according to claim 14, wherein the processor is a local processor and/or a remote processor.

18. The method according to claim 13, wherein the processor is a local processor and/or a remote processor.

19. The method according to claim 13, wherein the processor is a local processor and/or a remote processor.

* * * * *